(12) United States Patent
Yamada et al.

(10) Patent No.: US 10,902,614 B2
(45) Date of Patent: Jan. 26, 2021

(54) IMAGE RECOGNITION BY SETTING A RATIO OF COMBINING THE FEATURE CORRELATION COEFFICIENTS FOR THE RESPECTIVE ACQUIRED IMAGE FEATURE AMOUNTS

(71) Applicants: EQUOS RESEARCH CO., LTD., Tokyo (JP); KYUSHU INSTITUTE OF TECHNOLOGY, Kitakyushu-shi, Fukuoka (JP)

(72) Inventors: Hideo Yamada, Tokyo (JP); Kazuhiro Kuno, Tokyo (JP); Shuichi Enokida, Iizuka (JP); Tatsuya Hashimoto, Iizuka (JP)

(73) Assignees: EQUOS RESEARCH CO., LTD., Tokyo (JP); KYUSHU INSTITUTE OF TECHNOLOGY, Kitakyushu (JP)

( * ) Notice: Subject to any disclaimer, the term of this patent is extended or adjusted under 35 U.S.C. 154(b) by 39 days.

(21) Appl. No.: 16/088,776

(22) PCT Filed: Mar. 30, 2017

(86) PCT No.: PCT/JP2017/013279
§ 371 (c)(1),
(2) Date: Sep. 26, 2018

(87) PCT Pub. No.: WO2017/170876
PCT Pub. Date: Oct. 5, 2017

(65) Prior Publication Data
US 2020/0143544 A1    May 7, 2020

(30) Foreign Application Priority Data
Mar. 30, 2016   (JP) .................................. 2016-068436

(51) Int. Cl.
*G06T 7/246* (2017.01)
*G06K 9/46* (2006.01)

(52) U.S. Cl.
CPC ............ *G06T 7/246* (2017.01); *G06K 9/4642* (2013.01); *G06K 9/4652* (2013.01); *G06T 2207/10024* (2013.01)

(58) Field of Classification Search
CPC ............... G06T 7/246; G06T 7/248; G06T 2207/10024; G06K 9/4642; G06K 9/4647; G06K 9/4652
See application file for complete search history.

(56) References Cited

FOREIGN PATENT DOCUMENTS

| | | |
|---|---|---|
| JP | 2015-106307 A | 6/2015 |
| JP | 2015-230559 A | 12/2015 |

OTHER PUBLICATIONS

Liu et al., "A Robust Framework for Vehicle Detection and Tracking Based on Particle Filter," Joint International Mechanical, Electronic and Information Technology Conference (JIMET 2015), Jan. 1, 2015, pp. 803-811.

(Continued)

*Primary Examiner* — Christopher Wait
(74) *Attorney, Agent, or Firm* — Oliff PLC

(57) ABSTRACT

An image recognition device sets an overall observation region which surrounds a whole body of an object and partial observation regions which surround characteristic parts of the object respectively to locations in an image which are estimated to include captured images of the object. The device clips images in the overall observation region and the partial observation regions, and calculates similarity degrees between them and previously learned images on the basis of a combination of two image feature amounts. The device calculates an optimum ratio in combining the HOG feature amount and the color distribution (Continued)

feature amount individually for the regions. This ratio is determined by setting a weight parameter αi for setting a weight used for combining the HOG feature amount and the color distribution feature amount to be included in a state vector and subjecting the result to complete search by a particle filter.

21 Claims, 10 Drawing Sheets

(56) References Cited

OTHER PUBLICATIONS

Jin et al., "Human Tracking in the complicated background by particle filter using color-histogram and hog," 2010 International Symposium on Intelligent Signal Processing and Communication Systems (ISPACS 2010), Dec. 6-8, 2010.
Aug. 9, 2019 Extended Search Report issued in European Patent Application No. 17775410.8.
Shiina et al., "Object tracking in complex environment using particle filter based on feature domain," SSII2012 18th Symposium on Sensing via Image Information, Collection of papers, Jun. 2012, pp. IS2-15-1-IS2-15-8, Reviewed English Abstract and the drawings.
Jun. 6, 2017 International Search Report issued in International Patent Application No. PCT/JP2017/013279.
Oct. 2, 2018 International Preliminary Report on Patentability issued in International Patent Application No. PCT/JP2017/013279.

HOG FEATURE AMOUNT

HOG FEATURE AMOUNT SPACE

COLOR DISTRIBUTION
FEATURE AMOUNT SPACE

FIG.10

$$L(x) = \sum_{i=0}^{n} R(x_i) - \underbrace{\sum_{j=1}^{n} d_j \cdot \phi_d(dx_j, dy_j)}_{(1b)} \quad \cdots (1)$$

$$R(x_i) = \alpha_i \times \underbrace{F_i \cdot \phi(x_i)}_{(2a)} + (1-\alpha_i) \times \underbrace{p_i \cdot q_i}_{(2b)} \quad \cdots (2)$$

$$d_j = (a_{xi}, a_{yi}, b_{xi}, b_{yi}) \quad \cdots (3)$$

$$\phi_d(dx_i, dy_i) = (dx_i, dy_i, dx_i^2, dy_i^2) \quad \cdots (4)$$

$$L(x) = \sum_{i=0}^{n} R(x_i) \times W_i - \sum_{j=1}^{n} d_j \cdot \phi_d(dx_j, dy_j) \quad \cdots (5)$$

$$L(x) = \left\{ \sum_{i=0}^{n} R(x_i) \times W_i - \sum_{j=1}^{n} d_j \cdot \phi_d(dx_j, dy_j) \right\} \\ \times \underbrace{\left\{ \left( \sum_{i=0}^{n} W_i \right) / (n+1) \right\}^{\gamma}}_{(6a)} \quad \cdots (6)$$

$$\left\{ \sum_{i=0}^{n} \frac{\max -(0.5 - \alpha_i)}{\max} \right\}^{u} \times \left\{ \sum_{i=0}^{n} \frac{\max -(0.5 - \alpha_i)}{\max} \right\}^{v} \quad \cdots (7)$$

IMAGE RECOGNITION BY SETTING A RATIO OF COMBINING THE FEATURE CORRELATION COEFFICIENTS FOR THE RESPECTIVE ACQUIRED IMAGE FEATURE AMOUNTS

TECHNICAL FIELD

The present invention relates to an image recognition device, a mobile device, and an image recognition program and, for example, to those which recognize a tracking target included in an image.

BACKGROUND ART

In recent years, a demand for image recognition devices which recognize a target shown in images and tracks its movement has increased.

Each of such image recognition devices is mounted in, e.g., a vehicle or a robot and used for avoiding pedestrians or obstacles or mounted in a monitoring camera and used for tracking suspicious individuals.

Although various kinds of technologies to recognize/track a target in images have been suggested, a particularly excellent technology is a DPM (Deformable Part Model) used in "Object Identifying Device, Method, and Program" in Patent Literature 1.

According to this technology, when an overall region to recognize a whole body of a tracking target person is combined with a plurality of partial regions to recognize characteristic parts (a head region, a lumber region, and the like) of the tracking target person, even if recognition in the overall region is difficult due to a change is posture of the tracking target person, this difficulty is complemented by recognition in the partial regions to identify the tracking target person in images.

Meanwhile, in case of tracking a mobile body (e.g., a person), a photographing state of a tracking target varies in many ways with time when the tracking parson blends into the crowd or an illumination environment changes, for example.

On the other hand, although there are various kinds of methods for recognizing a tracking target in images, e.g., a method using detection of an edge of a target which is called an HOG feature amount or a method using a color distribution feature mount of a target, the methods have scenes which are easy for them to recognize and scenes which are hard for them recognize respectively, and using one of these methods alone leads to a problem which the methods cannot cope with a change in photographing state of a tracking target and tracking fails.

CITATION LIST

Patent Literature

Patent Literature 1: Japanese Patent Application Publication No. 2015-230559

DISCLOSURE OF INVENTION

Problem to be Solved by the Invention

An object of the present invention is to perform image recognition with high robustness.

Means for Solving the Problem (1) In order to achieve above mentioned object, the invention described in claim 1 provides an image recognition device comprising: image acquiring means for acquiring an image; observation region setting means for setting an observation region where a tracking target is observed in the acquired image on the basis of an observation region used for detection of the tracking target in an image at a previous moment; image feature amount acquiring means for acquiring a plurality of types of image feature amounts from the set observation region; feature correlation coefficient acquiring means for acquiring a feature correlation coefficient relative to a reference feature amount in accordance with each of the acquired image feature amounts; ratio setting means for setting a ratio of combining the feature correlation coefficients for the respective acquired image feature amounts on the basis of a ratio used for detection of the tracking target in the image at the previous moment; region correlation coefficient acquiring means for acquiring a region correlation coefficient for the observation region by combining the feature correlation coefficients at the set ratio; likelihood acquiring means for repeatedly acquiring a likelihood of a target observed in the observation region by using the region correlation coefficient acquired by the region correlation coefficient acquiring means while changing the observation region set by the observation region setting means and the ratio set by the ratio setting means; and detecting means for detecting the tracking target in the observation region in which a likelihood meeting a predetermined condition in a plurality of likelihoods acquired by the likelihood acquiring means is acquired.

(2) The invention described in claim 2 provides the image recognition device according to claim 1, wherein the observation region setting means sets a group of an overall observation region where the whole tracking target is observed and a plurality of partial observation regions where parts of the tracking target are observed as the observation region, the image feature amount acquiring means acquires the plurality of types of image feature amounts in accordance with each of the overall observation region and the partial observation regions, the feature correlation coefficient acquiring means acquires a feature correlation coefficient for each of the image feature amounts in accordance with each of the overall observation region and the partial observation regions, the ratio setting means sets the ratio in accordance with each of the overall observation region and the partial observation regions, the region correlation coefficient acquiring means acquires the region correlation coefficient in accordance with each of the overall observation region and the partial observation regions, and the likelihood acquiring means acquires the likelihood by using the region correlation coefficient for each of the overall observation region and the partial observation regions.

(3) The invention described in claim 3 provides the image recognition device according to claim 2, comprising weight setting means for setting a weight to the region correlation coefficient for each of the overall observation region and the partial observation regions on the basis of a weight used for detection of the tracking target in the image at the previous moment, wherein the likelihood acquiring means repeatedly acquires the likelihood while changing the weight as well.

(4) The invention described in claim 4 provides the image recognition device according to claim 3, wherein the likelihood acquiring means excludes the region correlation coefficient and acquires the likelihood when the region correlation coefficient falls below a predetermined threshold value.

(5) The invention described in claim 5 provides the image recognition device according to claim 3 or 4, comprising likelihood correcting means for performing a correction to decrease the likelihood particularly of a group of the overall observation region and the partial observation regions having a small sum total of the weights.

(6) The invention described in claim 6 provides the image recognition device according to claim 3, 4, or 5, comprising bias correcting means for performing correction to decrease the likelihood as the ratio set by the ratio setting means is biased.

(7) The invention described in claim 7 provides the image recognition device according to anyone of claims 3 to 6, wherein the ratio setting means and the weight setting means set the ratio and the weight to arbitrary values irrelevant to an image at a previous moment respectively when detection of the tracking target has failed.

(8) The invention described in claim 8 provides the image recognition device according to claims 1 to 7, wherein the plurality of types of image feature amounts are a luminance gradient distribution feature amount and a color distribution feature amount of the acquired image.

(9) The invention described in claim 9 provides the image recognition device according to anyone of claims 1 to 8, wherein the predetermined condition met by the likelihood is a maximum value of the likelihood.

(10) The invention described in claim 10 provides the image recognition device according to anyone of claims 1 to 9, wherein the region correlation coefficient acquiring means combines the acquired feature correlation coefficients by using a linear sum of the set ratios.

(11) The invention described in claim 11 provides a mobile device comprising: detecting means for detecting a target by using the image recognition device according to any one of claims 1 to 10; and moving means for moving to a predetermined position with respect to the detected target.

(12) The invention described in claim 12 provides an image recognition program which realizes functions by using a computer, the functions comprising: an image acquiring function to acquire an image; an observation region setting function to set an observation region where a tracking target is observed in the acquired image on the basis of an observation region used for detection of the tracking target in an image at a previous moment; an image feature amount acquiring function to acquire a plurality of types of image feature amounts from the set observation region; a feature correlation coefficient acquiring function to acquire a feature correlation coefficient relative to a reference feature amount in accordance with each of the acquired image feature amounts; a ratio setting function to set a ratio of combining the feature correlation coefficients for the respective acquired image feature amounts on the basis of a ratio used for detection of the tracking target in the image at the previous moment; a region correlation coefficient acquiring function to acquire a region correlation coefficient for the observation region by combining the feature correlation coefficients at the set ratio; a likelihood acquiring function to repeatedly acquire a likelihood of a target observed in the observation region by using the region correlation coefficient acquired by the region correlation coefficient acquiring function while changing the observation region set by the observation region setting function and the ratio set by the ratio setting function; and a detecting function to detect the tracking target in the observation region in which a likelihood meeting a predetermined condition in a plurality of likelihoods acquired by the likelihood acquiring function is acquired.

Effect of the Invention

According to the present invention, combining a plurality of types of image feature amounts enables carrying out image recognition with high robustness.

BRIEF DESCRIPTION OF DRAWINGS

FIG. 10 is an explanatory drawing showing mathematical expressions used in each embodiment.

BEST MODE(S) FOR CARRYING OUT THE INVENTION (1) Outline of Embodiments

Figure 1A:
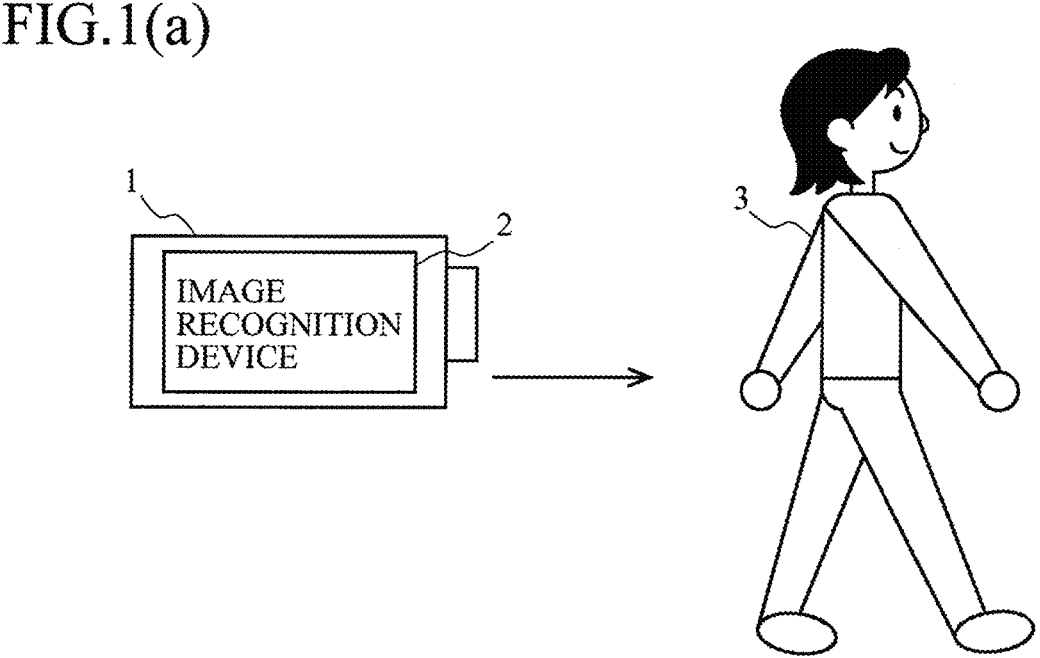
FIG. 1 are drawings for illustrating an application mode or observation regions of an image recognition device.
Figure 1B:
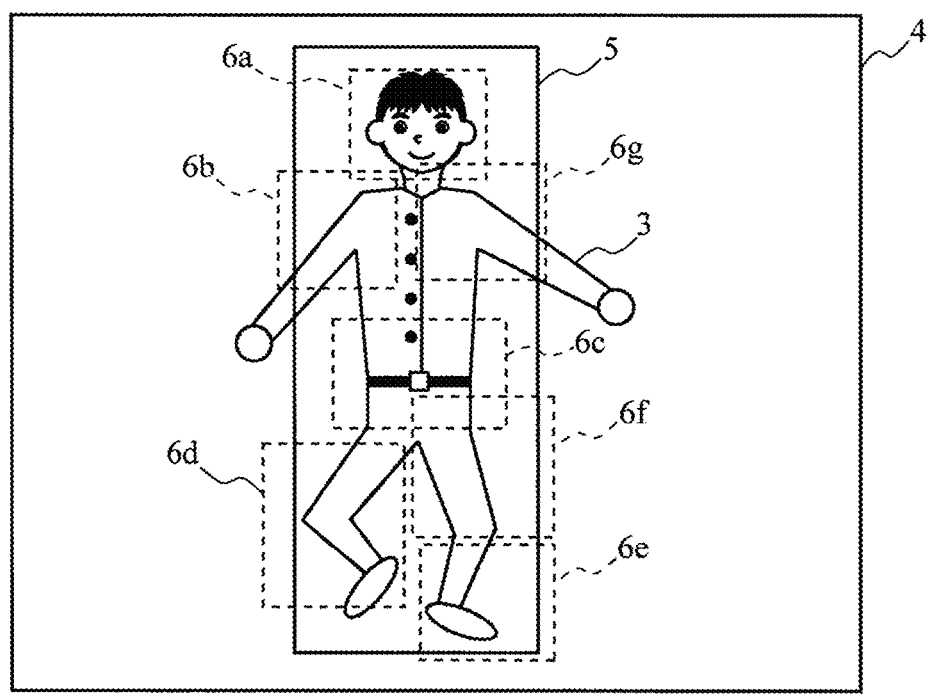

As shown in FIG. 1(b), an image recognition device 2 sets an overall observation region 5 which surrounds a whole body of an object 3 and partial observation regions 6a to 6g which surround characteristic parts of the object 3 respectively to locations in an image 4 which are estimated to include captured images of the object 3.

The image recognition device 2 clips images in the overall observation region 5 and the partial observation regions 6a to 6g, and calculates similarity degrees between them and previously learned images on the basis of a combination of two image feature amounts, i.e., an HOG feature amount and a color distribution feature amount. Although these two image feature amounts have different scenes which they are good or poor at respectively, combining these scenes enables both the image feature amounts to complementarily function.

Further, the image recognition device 2 calculates an optimum ratio (percentage) in combining the HOG feature amount and the color distribution feature amount individually for the overall observation region 5 and the partial observation regions 6a to 6g.

This ratio is determined by setting a weight parameter $\alpha i$ for setting a weight used for combining the HOG feature amount and the color distribution feature amount to be included in a state vector and subjecting the result to complete search by a particle filter.

In this manner, the image recognition device 2 can combine the two image feature amounts with the use of weighting suitable for a scene to perform image recognition and tracking which have robustness against a change in photographing environment, for example, a change in light and shade or a change in density of pedestrians around the object 3.

(2) Details of Embodiments

First Embodiment

FIG. 1(a) is a drawing for illustrating an application mode of the image recognition device 2 according to this embodiment.

A camera 1 is, for example, a portable moving image capturing camera constituted of a video camera and the like. A user holds the camera 1 and captures moving images of an object 3 while following the object 3 that is a tracking target.

As will be described later, since the image recognition device 2 is robust against a change in state, for example, entanglement of the object 3 in crowds or a light-dark change, it can track the objet 3 while moving itself and accepting such changes.

Thus, the image recognition device 2 is suitable to be mounted in a mobile body such as a vehicle or a robot.

The image recognition device 2 is incorporated in the camera 1, and continuously detects the object 3 in images of respective frames in a captured video to track the object 3 on the images.

It is to be noted that the image recognition device 2 may be installed outside the camera 1, and moving images may be transferred from the camera 1 to the image recognition device 2.

Although the tracking target is a person as an example in the following description, the tracking target is not restricted, and an arbitrary mobile body can be determined as the tracking target.

FIG. 1(b) is a drawing for illustrating a method for recognizing the object 3 by using an image 4.

The image 4 shows an image constituting a given frame in a moving image which has been captured by the camera 1 and output to the image recognition device 2.

In this manner, the image recognition device 2 includes image acquiring means for acquiring the image 4.

The image recognition device 2 sets a rectangular overall observation region 5 which surround a whole body of the object 3 and rectangular partial observation regions 6a to 6g which surround characteristic parts of the object 3 to regions in the image 4 at the present moment which are estimated to show the object 3 on the basis of the object 3 detected in an image 4 at a previous moment (an image at a preceding moment which is an image in a previous frame in this example).

In the example in the drawing, the partial observation regions 6a to 6g are set to a head region, a left upper limb region, a lumbar region, a left lower limb region, a lower side of the lower limb region, a right lower limb region, and a right upper limb region of the object 3.

In the following description, the partial observation regions 6a to 6g are simply referred to as partial observation regions 6 when they are not discriminated from each other in particular, and the overall observation region 5 and the partial observation regions 6 are simply referred to as observation regions when they are not discriminated from each other in particular.

The image recognition device 2 produces many overall observation regions 5 and partial observation regions 6, which are different in position or size, near the overall observation region 5 and the partial observation regions 6 from which the object 3 has been detected in the image 4 at the previous time on the basis of these regions by using a particle filter technique, and the example shown in the drawing is a combination of these regions.

The overall observation region 5 is called a root filter, and the partial observation regions 6 are called part filters.

In this manner, the image recognition device 2 includes observation region setting means for setting observation regions where a tracking target is observed in the acquired image 4 on the basis of observation regions used for detection of the tracking target in the image at the previous moment.

Further, the observation region setting means sets a group of the overall observation region 5 where the entire tracking target is observed and the plurality of partial observation regions 6 where parts of the tracking target are observed as the observation regions.

The image recognition device 2 clips (extracts) portions surrounded by these regions from the image 4, and calculates a correlation coefficient (a feature correlation coefficient) representing a similarity degree which expresses how much each clipped image is similar to each previously learned image by using an inner product in a later-described image feature amount space.

Furthermore, the image recognition device 2 combines (integrates) correlation coefficients calculated in relation to the overall observation region 5 and the partial observation regions 6 to calculate a correlation coefficient (a region correlation coefficient) based on the group of the overall observation region 5 and the partial observation regions 6, and calculates a likelihood with the use of the correlation coefficient based on the group of the overall observation region 5 and the partial observation regions 6.

The likelihood is an amount which represents how much the target observed based on the group of the overall observation region 5 and the partial observation regions 6 is the object 3.

The image recognition device 3 produces many overall observation regions 5 and partial observation regions 6a to 6g which have parameters of a size, a position, and the like slightly different from each other by using the particle filter technique, and calculates likelihoods for various combinations. Consequently, a likelihood distribution can be obtained.

The image recognition device 2 determines the target observed on the basis of the group of the overall observation region 5 and the partial observation regions 6a to 6g which provides the maximum likelihood as the object 3, thereby detecting the object 3 from the image 4.

It is to be noted that, for example, a threshold value may be provided to the likelihood, and the target observed on the basis of the group of the overall observation region 5 and the partial observation regions 6a to 6g at the moment may be determined as the object 3 when the likelihood exceeds the threshold value, namely, any other criteria can be adopted.

An outline of the particle filter technique will now be described.

In the image 4 at the previous moment, the overall observation region 5 and the partial observation regions 6a to 6g are fixed, and this is assumed to be an initial state.

This state is represented as a state vector X= (a position of the overall observation region 5, a size of the overall observation region 5, a position of each partial observation region 6, . . . ) as an example.

Since it can be considered that the overall observation region 5 and the partial observation regions 6 in the image 4 at the current moment are not very different from those at the previous moment, in relation to each state variable (a component of the state vector) of the state vector X, white noise is produced near each value at the previous time (Gaussian white noise having the value at the previous moment as an average value is produced), this is superimposed on the value at the previous moment, and a result is estimated as a value at the current moment. Each value having the white noise superimposed thereon corresponds to a particle.

In this manner, the image recognition device 2 presumes a change in state of the object 3 as a Markov process which is determined by a value at a previous moment and is not tied to a previous history, and changes a state vector at the previous moment on the basis of the state change model to estimate a state vector at the current moment.

The image recognition device innumerably produces the overall observation regions 5 and the partial observation regions 6 which are slightly different from the observation regions at the previous moment by innumerably producing particles with the use of the white noise.

Consequently, the image recognition device 2 randomly searches for (seeks) a combination of the overall observation region 5 and the partial observation regions 6 which provides the maximum likelihood, and detects the object 3 on the basis of the found combination of the overall observation region 5 and the partial observation regions 6. This is a sequential Bayesian estimation problem using the Markov property.

Then, the image recognition device 2 determines the found overall observation region 5 and the partial observation regions 6 as an initial state, produces particles, and carries out the same processing in a subsequent image 4. The image recognition device 2 recognizes/tracks the object 3 in the respective continuous images 4 in the moving image by sequentially repeating this process.

As described above, according to the particle filter technique adopted in the image recognition device 2, a target is tracked while repeating a cycle, i.e., a state change (many observation regions are produced), the observation (searching for a combination with the maximum likelihood), and duplication (set a found combination to an initial value).

Basically, images similar to learned images are searched from the overall images 4 with the use of all combinations, but making a guess at each position where the object 3 is shown and carrying out the search in the vicinity of this position enables making the image recognition processing more efficient.

An image recognition amount used by the image recognition device 2 for image recognition will now be described.

The image recognition device 2 uses a combination of an HOG (Histogram of Oriented Gradients) feature amount and a color distribution feature amount.

That is because the HOG feature amount is robust against a light-dark change but poor at discrimination from persons around a target, whereas the color distribution feature mount is weak against a light-dark change but good at different scenes, e.g., easy discrimination from persons around a target, and hence a complementary effect can be expected by combining these feature amounts.

As described above, the image recognition device 2 uses a plurality of types of image feature amounts consisting of a luminance gradient distribution feature amount and a color distribution feature amount of each image.

FIG. 2 are drawings for illustrating a concept of the HOG feature amount.

The HOG feature amount is an image feature amount using a luminance gradient distribution, and it is a technology to detect edges of a target. For example, it recognizes the target from a silhouette formed of the edges.

The HOG feature amount is extracted from an image by the following procedure.

Figure 2A:
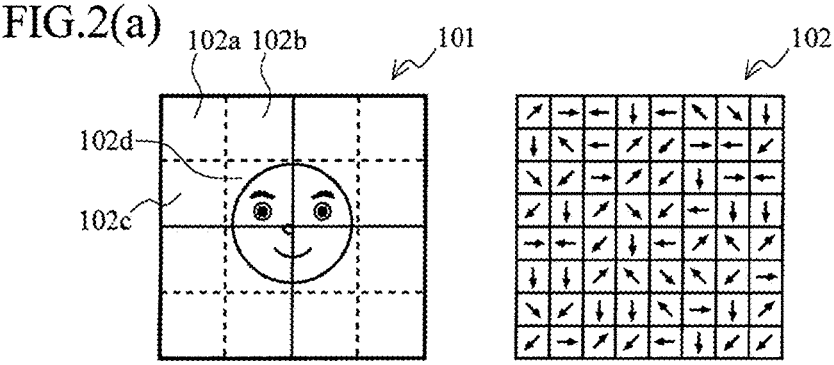
FIG. 2 are drawings for illustrating a concept of an HOG feature amount.

An image 101 shown in a left drawing of FIG. 2(a) is assumed to be an image-of-interest region which is an overall observation region 5 or a partial observation region 6.

First, the image 101 is divided into rectangular cells 102a, 102b, . . . .

Then, as shown in a right drawing of FIG. 2(a), luminance gradient directions (directions from a low luminance toward a high luminance) of respective pixels are quantized into, e.g., eight directions in accordance with each cell 102.

Figure 2B:
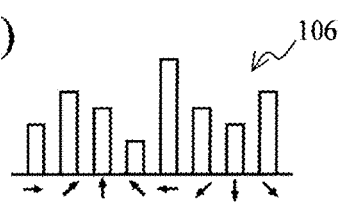

Subsequently, as shown in FIG. 2(b), the quantized directions of the luminance gradients are determined as classes, and a histogram showing the number of occurrence as a frequency is produced, whereby the histogram 106 of the luminance gradients included in the cell 102 is produced in accordance with each cell 102.

Further, normalization is performed in such a manner that a total frequency of the histograms 106 becomes 1 in blocks each forming a group of several cells 102.

In the example shown in the left drawing of FIG. 2(a), the cells 102a, 102b, 102c, and 102d form one block.

Figure 2C:
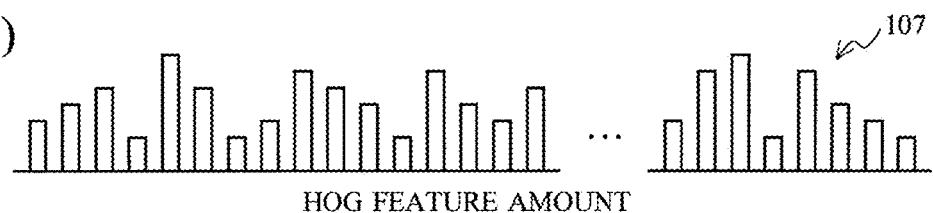

A histogram 107 in which the histograms 106a, 106b, . . . normalized in this manner are arranged in a line as shown in FIG. 2(c) becomes an HOG feature amount of the image 101.

A similarity degree of each image using the HOG feature amount is determined as follows.

First, a consideration is given to a vector $\phi(x)$ having a frequency (which is assumed to be M) of the HOG feature amount as a component. Here, x is a vector which represents the image 101, and x= (a luminance of a first pixel, a luminance of a second pixel, . . . ) is achieved.

It is to be noted that the vector is written by using a bold type, but, it is written in a normal letter in the following description to avoid garble.

Figure 2D:
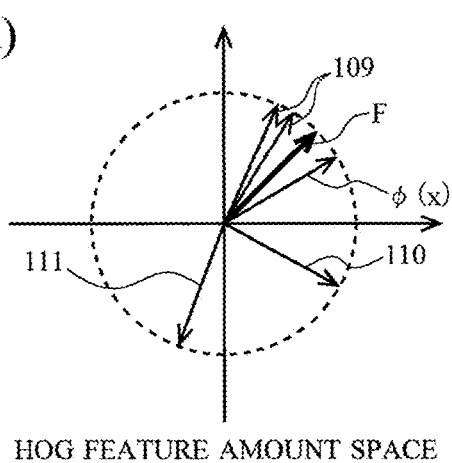

FIG. 2(d) shows an HOG feature amount space, and the HOG feature amount of the image 101 is mapped to vectors $\phi(x)$ in an M-dimensional space.

It is to be noted that the drawing shows the HOG feature amount space as a two-dimensional space for simplification.

On the other hand, F is a weight vector obtained by learning person images, and it is a vector provided by averaging HOG feature amounts of many person images.

Each $\phi(x)$ is distributed around F like vectors 109 when the image 101 is similar to learned images, or it is distributed in a direction different from that of F like vectors 110 and 111.

F and $\phi(x)$ are standardized, and a correlation coefficient defined by an inner product of F and $\phi(x)$ approximates 1 as the image 101 becomes more similar to the learned images, and it approximates −1 as a similarity degree lowers.

In this manner, when the image which is a target of similarity determination is mapped to the HOG feature amount space, each image similar to the learned images and each image which is dissimilar to the same can be separated from each other by using the luminance gradient distribution.

As feature amount extraction technologies using luminance gradient distributions, there are CoHOG (Co-occurrence HOG) obtained by improving HOG, MRCoHOG (Multi Resolution CoHOG) obtained by further enhancing the former, and the like besides HOG, and any technology can be used.

FIG. 3 are drawings for illustrating a concept of the color distribution feature amount.

Figure 3A:
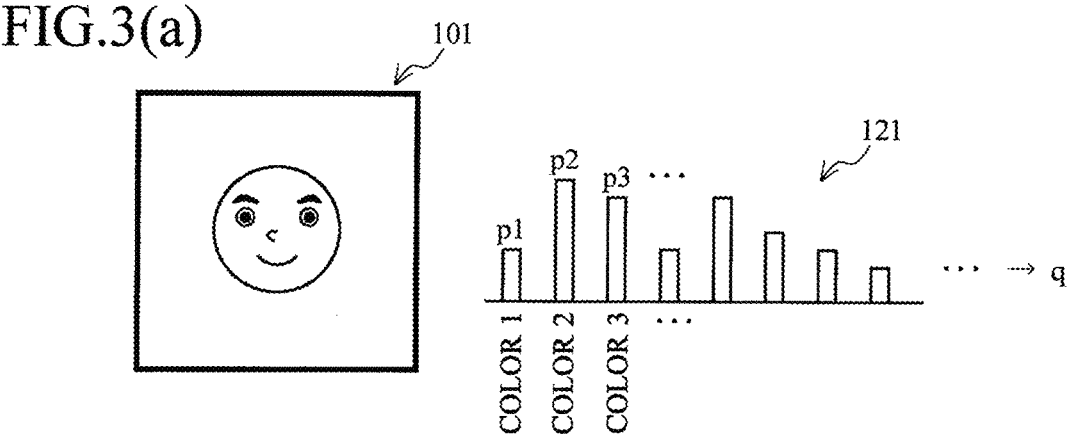
FIG. 3 are drawings for illustrating a concept of a color distribution feature amount.

An image 101 in a region of interest shown in FIG. 3(a) is constituted of pixels having various color components (a color 1, a color 2, . . . ).

When a histogram 121 is produced from appearance frequencies of these color components, a vector q having this frequency as a component is provided.

Figure 3B:
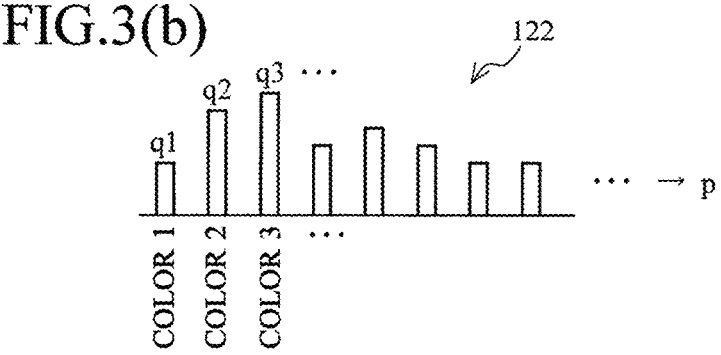

On the other hand, as shown in FIG. 3(b), a similar histogram 122 is produced for a tracking target model, and a vector p having this frequency as a component is provided.

Figure 3C:
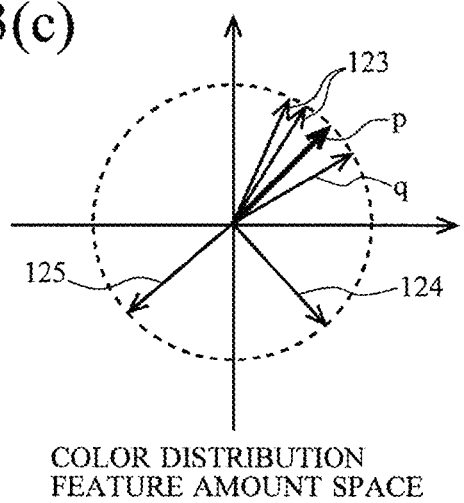

Assuming that the number of these color components is N, the color distributions of the image 101 and the tracking target model are mapped to N-dimensional color distribution feature amount space vectors p and q as shown in FIG. 3(c).

q is distributed around p like vectors 123 when the image of the image 101 is similar to the tracking target model, or it is distributed in a direction different from that of p like vectors 124 and 125 when the images are dissimilar to each other.

q and p are standardized, and a correction coefficient defined by an inner product of q and p approximates 1 as the image 101 becomes more similar to the tracking target model, and it approximates −1 as a similarity degree lowers.

In this manner, when the image which is a target of similarity determination is mapped to the color distribution feature amount space, each image which is similar to the tracking target model and each image which is dissimilar to the same can be separated from each other on the basis of the color distribution feature amounts.

A likelihood calculation method using these element technologies will now be described.

FIG. 10 shows each mathematical expression used in the embodiment.

The image recognition device 2 carries out observation using HOG feature amounts and observation using color distribution feature amounts in accordance with each observation region, and dynamically combines correlation coefficients of the HOG feature amounts and correlation coefficients of the color distribution feature amounts to thereby calculate a likelihood. Specifically, a computational expression of a likelihood L(x) is defined by Expression (1) in FIG. 10.

A first term on a right side of Expression (1) takes a sum total of $R(x_i)$ from i=0 to n.

It is to be noted that n is the number of the partial observation regions 6, and i=0, 1, 2, . . . corresponds to the overall observation region 5 and the partial observation regions 6a, 6b, . . . .

Furthermore, to avoid garble, subscript lower-case characters are written by using double-type characters.

As indicated by Expression (2) in FIG. 10, $R(x_i)$ is a linear sum of a correlation coefficient (a term 2a) of the HOG feature amount and a correlation coefficient (a term 2b) of the color distribution feature amount in an ith observation region.

$\alpha_i$ is a weight parameter in the linear sum and can take a value ranging from 0 to 1, but a value ranging from 0.25 to 0.75 is used in the image recognition device 2, and this value is set so that both the feature amounts can necessarily contribute to $R(x_i)$.

Here, since $\phi(x_i)$ and $q_i$ in the terms (2a) and (2b) are the HOG feature amount and the color distribution feature amount in the ith observation region, the image recognition device 2 includes image feature amount acquiring means for acquiring a plurality of types of image feature amounts from the set observation regions, and the image feature amount acquiring means acquires a plurality of types of image feature amounts in accordance with each of the overall observation region 5 and the partial observation regions 6.

Moreover, $F_i$ and $p_i$ in the terms (2a) and (2b) function as reference feature amounts. Additionally, the terms (2a) and (2b) represent the correlation coefficients (similarity degrees) of the HOG feature amount and the color distribution feature amount in the ith observation region respectively, and they function as feature correlation coefficients.

Thus, the image recognition device 2 includes feature correlation coefficient acquiring means for acquiring a feature correlation coefficient relative to the reference feature amount in accordance with each acquired image feature amount, and the feature correlation coefficient acquiring means acquires a feature correlation coefficient of each image feature amount in accordance with each of the overall observation region 5 and the partial observation region 6.

According to Expression (2) in FIG. 10, a contribution of the HOG feature amount to $R(x_i)$ increases as $\alpha_i$ becomes large, and a contribution of the color distribution feature amount increases as $\alpha_i$ becomes small.

Thus, appropriately selecting $\alpha_i$ enables acquiring a value suitable for each scene and improving robustness.

Values from 0.25 to 0.75 are basically exhaustively searched for a value of $\alpha_i$, but it is unlikely that the HOG feature amount and the color distribution feature amount abruptly extremely change in an adjacent frame, and values at a previous moment are intensively searched to improve efficiency.

More specifically, as will be described later, the image recognition device 2 includes $\alpha_i$ in the state vector and more dynamically performs estimation by using the particle filter technique.

Here, $\alpha_i$ functions as a ratio to combine feature correlation coefficients in accordance with each acquired image feature amount, and the image recognition device 2 includes ratio setting means for setting this ratio on the basis of a ratio used in detection of a tracking target in the image 4 at a previous moment in order to set the ratio based on values at the previous moment. Further, the ratio setting means sets this ratio in accordance with each of the overall observation region 5 and the partial observation regions 6.

Furthermore, $R(x_i)$ functions as a region correlation coefficient which is set to the ith observation region by combining the feature correlation coefficients at the ratio set by the ratio setting means, and the image recognition device 2 includes region correlation coefficient acquiring means for acquiring the region correlation coefficient.

Moreover, the region correlation coefficient acquiring means combines the feature correlation coefficients with the use of a linear sum based on the set ratio, for example.

Additionally, the region correlation coefficient acquiring means acquires the region correlation coefficient in accordance with each of the overall observation region 5 and the partial observation region 6 by calculating the ith $R(x_i)$.

The second term of Expression (1) in FIG. 10 is called a penalty, and the term (1b) is added to j=1 to n, namely, all the partial observation regions 6. In this manner, the overall observation region 5 is not included in the penalty.

The penalty is an amount which is used to eliminate a combination of the overall observation region 5 and the partial observation regions 6 when the partial observation regions 6 take an unnatural conformation to the overall observation region 5, for example, when a head region of a walking object 3 suddenly appears near an abdominal region. As the penalty increases, a target is unnatural and should be eliminated.

In this embodiment, a penalty used in conventional technologies is adopted.

A vector dj of the term (1b) of Expression (1) in FIG. 10 is called a deformation cost and expressed by Expression (3). This amount is obtained by learning unnatural conformations of the partial observation regions 6.

A vector φd of the term (1b) represents a change state of the partial observation regions 6 and is expressed by Expression (4). A component (dx, dy) in this vector φd corresponds to a position of each partial observation region 6, and (a square of dx, a square of dy) corresponds to a traveling distance of each partial observation region 6. That is, φd is an amount obtained by adding a position and a traveling distance of the partial observation region 6.

An unnaturalness degree is calculated by taking an inner product of φd and dj, and a larger penalty is subtracted from a likelihood L(x) as a position or a traveling distance of the partial observation region 6 becomes more unnatural.

The state vector used in this embodiment will now be described.

Although the image recognition device 2 produces many groups of the overall observation region 5 and the partial observation regions 6 and searches for a group which maximizes the likelihood, a state vector Xs of an sth group is represented as, e.g., Xs= ((x, y), a size, (dxj, dyj), αi).

j=1, 2, . . . , n and i=0, 1, . . . , n are determined, and n is the number of the partial observation regions 6.

(x, y) is a central coordinate of the overall observation region 5, the size is a size of the overall observation region 5, (dxj, dyj) is an arrangement of the partial observation regions 6, and αi is a weight parameter used in Expression (2).

In the image recognition device 2, particles having, e.g., Gaussian white noise (Gaussian noise; a normal distribution random number) superimposed thereon are sequentially produced to successively generate a plurality of groups of the observation regions near values at a previous moment, thereby changing a state.

It is to be noted that the Gaussian white noise is white noise produced in accordance with a normal distribution (a Gaussian distribution).

For example, when α at a time t in the ith region is represented as α(i, t), α(i, t)=N(α(i, (t−1)), a square of σα) is expressed. That is, a distribution of α after a change becomes a normal distribution in which α at a previous moment is an average and a variance is a square of σα.

In this manner, the image recognition device 2 uses a state change model which determines a value at a previous time is an average and changes each state variable with the use of a variance for each state variable.

Further, the image recognition device 2 includes the weight parameter αi in the state vector, and dynamically performs the estimation by using the particle filter technique.

That is, αi is included in a sequential estimation algorithm of the particle filter technique, and an effective value is estimated by sequential Bayes estimation.

Furthermore, the image recognition device 2 identifies a group of the overall observation region 5 and the partial observation regions 6 which maximizes the likelihood L(x), namely, identifies a state vector which maximizes the likelihood L(x) to detect the object 3.

In this manner, the image recognition device 2 includes likelihood acquiring means for repeatedly acquiring a likelihood of a target which is observed in observation regions by using each region correlation coefficient acquired by the region correlation coefficient acquiring means while changing the observation regions set by the observation region setting means and the ratio set by the ratio setting means.

Moreover, the likelihood acquiring means acquires the likelihood L(x) by using the region correlation coefficient for each of the overall observation region 5 and the partial observation regions 6.

Additionally, to detect the object 3 on the basis of a group of the overall observation region 5 and the partial observation regions 6 which provides the maximum likelihood, the image recognition device 2 includes detecting means for detecting a tracking target in the observation regions from which the likelihood meeting a predetermined condition in a plurality of likelihoods acquired by the likelihood acquiring means is acquired, and the predetermined condition is a maximum value of the likelihoods.

Although the image recognition device 2 searches for the object 3 by, for example, setting an upper limit to the number of particles and obtaining the likelihoods L(x) for all the particles to search for a maximum value, other conditions may be used.

For example, a predetermined threshold value can be set to the likelihood L(x) and the search is terminated when this threshold value is met, or the likelihood L(x) which provides a local maximum can be adopted and the search is terminated when a local maximum point appears in a process of acquiring a distribution of the likelihood L(x).

Figure 4A:
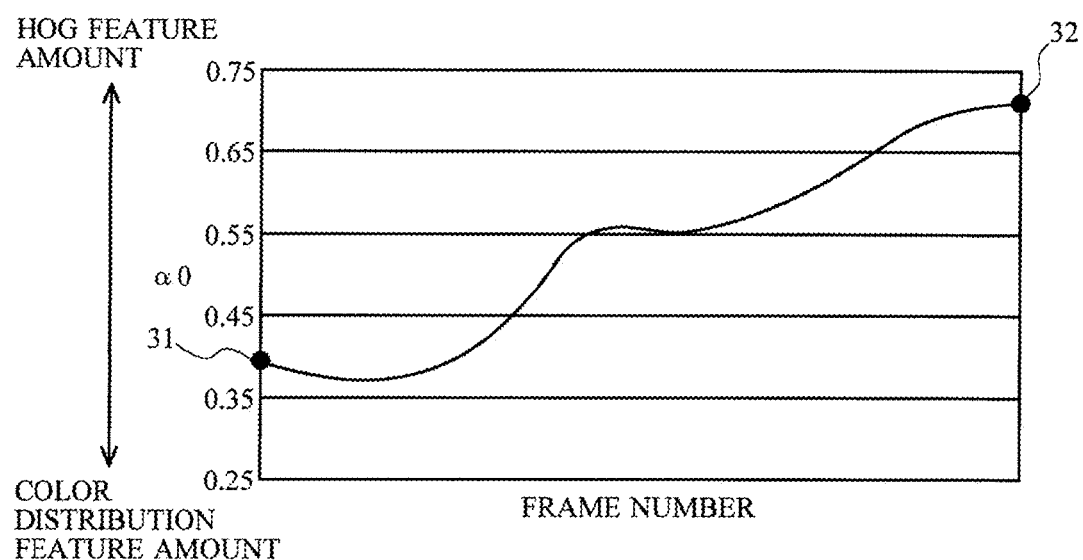
FIG. 4 are drawings for illustrating an experiment result.

FIG. 4(a) shows a graph in which a situation where α is also used in an experiment of tracking the object 3 is recorded.

An axis of ordinate represents a weight parameter α0 of the overall observation region 5. As to this weight parameter α0, ratios of recognition based on the color distribution feature amount and the HOG feature amount are specified, and a total of the recognition ratios of both the feature amounts is 1. For example, when the weight parameter α0 is 0.4, a ratio of recognition based on the color distribution feature amount is 0.4, and a ratio of recognition based on the HOG feature amount is 0.6.

Thus, a value of the weight parameter α0 can be set to fall within the range of 0 to 1, but it falls within a range of 0.2 to 0.75 in this embodiment.

It is to be noted that the range in which the weight parameter αi can fall may be changed depending on a type, a size, a characteristic shape, or the like of a tracking target.

An axis of abscissa represents a frame number of a moving image obtained by photographing the tracking target, and it shows an elapse of time.

In the experiment, the object 3 was walked on the premises of a large building, and the object 3 was filmed by a camera 1 while following him/her.

Figure 4B:
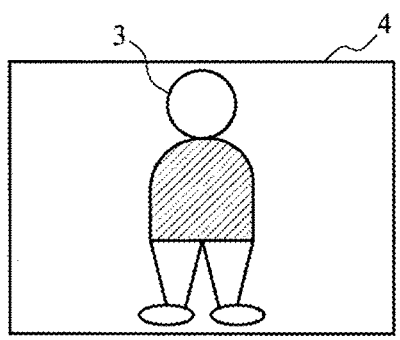
Figure 4C:
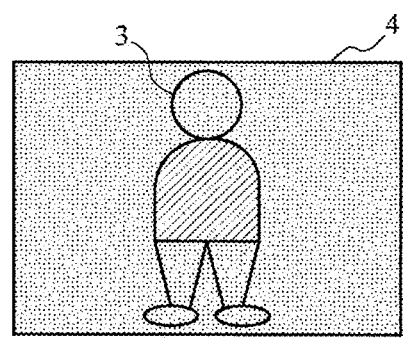

The object 3 put on a red outfit which stands out from the environment, and he/she moved from a spot 31 with bright illumination shown in FIG. 4(b) toward a shady dark spot 32 shown in FIG. 4(c).

At the spot 31, since the environment is bright and colors can be observed well, recognition based on a color distribution feature amount is considered to be advantageous.

On the other hand, at the spot 32, the environment is dark and identification based on colors is difficult, and hence an HOG feature amount which is strong against a light-dark change is considered to be advantageous.

In an experiment result, as shown in the graph, recognition based on the color distribution feature amount was advantageous at the spot 31 since α0 was approximately 0.4, but the value of α0 gradually increased as the object 3 walked toward the darkness, a ratio of recognition based on the HOG feature amount rose, and α0 became approximately 0.7 at the spot 32.

It was confirmed from this experiment that the role sharing of the HOG feature amount and the color distribution feature amount for each scene functions in correspondence with each environment as intended.

This is also true to the parameters α1, α2, . . . in the partial observation regions 6a, 6b, . . . .

According to the first embodiment described above, the following effects can be obtained.
(1) When the HOG feature amount and the color distribution feature amount are combined and weighting is changed in correspondence with a situation, image recognition which is robust against a change in situation can be carried out.
(2) When the weight parameter αi is included in the state vector, an optimum value can be dynamically estimated by using the particle filter technique.
(3) Since the robustness is provided against a change in situation, the image recognition device 2 can be mounted in a mobile body such as a robot or a vehicle, and a tracking target around the mobile body can be tracked while moving, or a target which moves closer to the mobile body can be avoided.

Second Embodiment

In this embodiment, robustness against partial hiding of an object 3 is improved.

There is a case where a shielding object such as another pedestrian or an obstacle enters observation regions during tracking of the object 3, a likelihood is thereby lowered, and the tracking fails.

Thus, in the second embodiment, as indicated by Expression (5) in FIG. 10, a correlation coefficient R(xi) of each observation region is weighted by a weight parameter Wi, and a contribution of each observation region where hiding occurs is adjusted to decrease.

Wi in Expression (5) in FIG. 10 is a weight parameter for an ith observation region, and it takes a value ranging from 0 to 1.

Specifically, W0 is a weight parameter of an overall observation region 5. Further, W1, W2, . . . are weight parameters of partial observation regions 6a, 6b, . . . .

Although values of the weight parameters Wi are basically determined by exhaustive search, they are gradually hidden in a time-series manner when a part of the object 3 is hidden.

Consequently, it can be considered that a value of each weight parameter Wi is not greatly different from a value at a previous time, the search is performed in the vicinity of this value.

Thus, the weight parameter Wi is included in a state vector Xs, Xs= ((x, y), a size, (dxj, dyj), αi, Wi) is set, and the search is carried out by the particle filter technique.

In this manner, the image recognition device 2 includes weight setting means for setting a weight to the region correlation coefficient R(xi) for each of the overall observation region 5 and the partial observation regions 6 on the basis of a weight used for detection of a tracking target in an image at a previous moment, and likelihood acquiring means repeatedly acquires a likelihood while changing this weight.

Although the basic of the estimation method of the weight parameter Wi is as described above, when a value of R(xi) is smaller than a predetermined threshold value, the image recognition device 2 determines that hiding has occurred in the observation region and sets the weight parameter Wi=0 to achieve a further improvement in performance.

This setting is configured to suppress unstable detection since R(xi) takes a value ranging from −1 to 1, but R(xi) takes a value closer to −1 when the hiding has occurred, and hence a large value is subtracted from a likelihood L(x).

Thus, the image recognition device 2 corrects the weight parameter Wi to 0 when R(xi) falls below the predetermined threshold value. The threshold value can be provided by an experiment, but the weight parameter Wi=0 is set when R(xi) is negative as an example.

Consequently, each observation region where the hiding has occurred can be cut off from a likelihood calculation, and the object 3 can be recognized on the basis of each observation region where the object 3 is recognized.

In this manner, when the region correlation coefficient R(xi) falls below the predetermined threshold value, the likelihood acquiring means excludes this region correlation coefficient and acquires a likelihood.

Figure 5A:
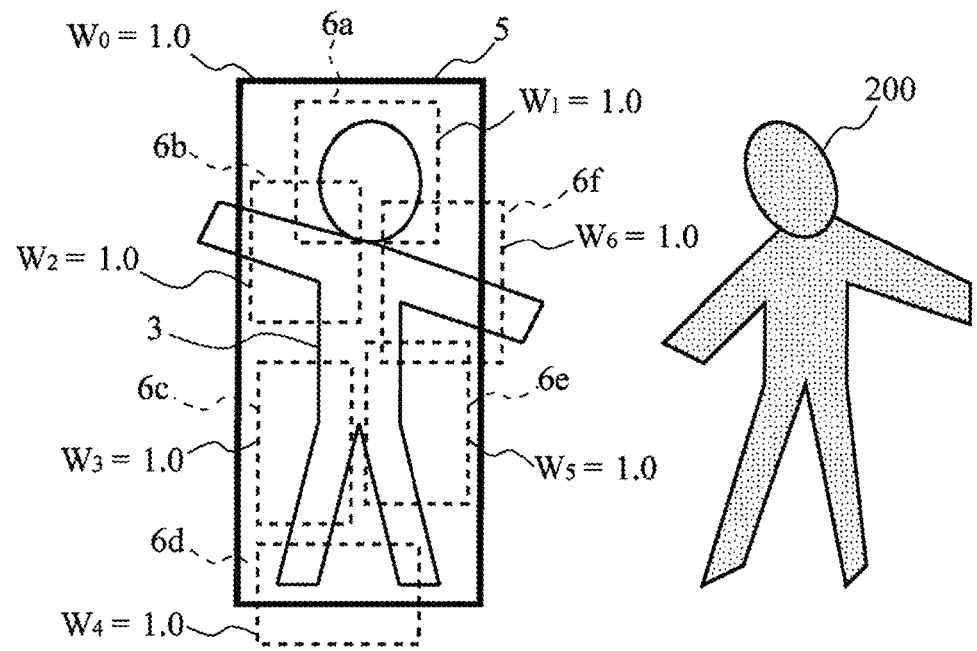
FIG. 5 are drawings for illustrating a weight parameter Wi.

FIG. 5(a) is an example showing the weight parameters Wi when no hiding has occurred.

The object 3 is walking with a pedestrian 200, but they do not overlap in a field of view of the camera 1.

In this case, since no hiding has occurred in the overall observation region 5 and the partial observation regions 6, W0 to W6 all take 1.0.

Figure 5B:
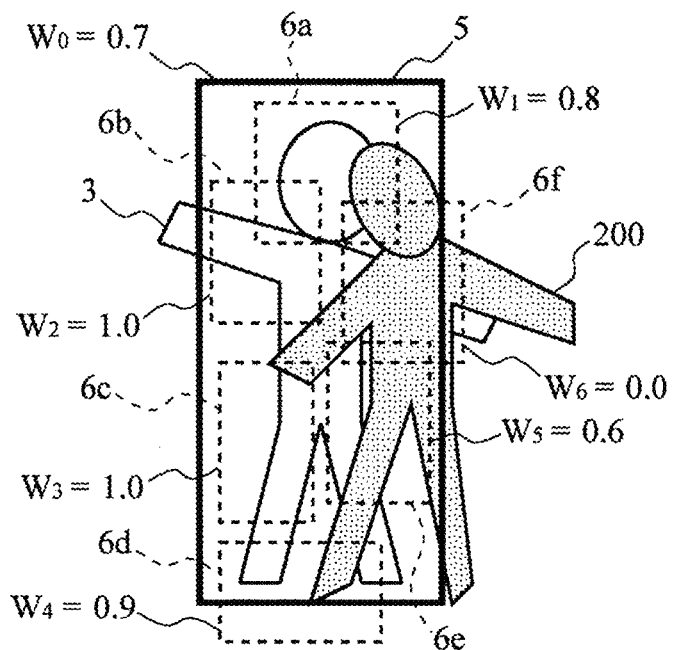

FIG. 5(b) is an example showing the weight parameters Wi when the hiding has occurred.

Apart of the object 3 overlapped the pedestrian 200, and the hiding has occurred.

The partial observation regions 6b to 6c have almost no hiding, and hence each of W2 and W3=1.0 is achieved.

The partial observation regions 6a and 6d have slight hiding, and hence W1=0.8 and W4=0.9 are achieved.

In the overall observation region 5 and the partial observation region 6e, nearly a half of the object is hidden, and hence W0=0.7 and W5=0.6 are achieved.

In the partial observation region 6f, since almost all of the object is hidden and R(x6) becomes negative, W6=0.0 is set, and the partial observation region 6f is separated from the calculation of the likelihood L(x).

According to the second embodiment described above, the following effects can be provided.
(1) In combinations of the observation regions, weighting to realize an optimum value contributing to the likelihood calculation can be set to each observation region.
(2) When each weight parameter Wi is included in the state vector, each optimum value can be dynamically estimated by using the particle filter technique.
(3) The weight parameter Wi in each observation region including the hiding which leads to a reduction in likelihood can decrease, and the likelihood calculation with noise due to the hiding being reduced can be carried out.
(4) In regard to each observation region where the hiding is considerable, this region can be excluded from the likelihood calculation, and each observation region where the object 3 is observed enables providing an appropriate likelihood.
(5) Since tracking can be continued even if the object 3 is partially hidden, the object 3 can be tracked even in a place where pedestrian or motor vehicle traffic is heavy.

Third Embodiment

In this embodiment, reliability of a likelihood is evaluated on the basis of each weight parameter Wi, and it is reflected in the likelihood.

For example, it is assumed that a likelihood when weight parameters (W0, W1, W2, W3, W4, W5, and W6) are (1.0, 1.0, 1.0, 1.0, 1.0, 1.0, and 1.0) is the same as a likelihood when the same are (0.4, 1.0, 0.3, 0.2, 0.1, 0.0, and 0.0).

In this case, an object 3 is entirely observed in the former case where the values of the weight parameters Wi are larger as a whole, and hence the former case is considered to have higher reliability.

That is, in the observation biased to a partial local region, a possibility that an object having partially similar characteristics is tracked by mistake becomes high, and hence a likelihood in which more observation results are reflexed is considered to be reliable.

Thus, in this embodiment, a reliability factor to evaluate reliability (a reliability degree) by using a sum total of the weight parameters Wi is defined by a term (6a) of Expression (6) in FIG. 10, and this factor is multiplied by the likelihood L(x), whereby the likelihood is corrected to decrease when the reliability is low.

The term (6a) is normalized by dividing a sum of the weight parameters Wi by n+1, and it takes a value which becomes closer to 0 as the reliability falls or takes a value which becomes closer to 1 as the reliability rises.

Raising to the power of γ is so-called gamma correction, and it is a parameter to adjust characteristics of an influence of the sum total on the likelihood calculation.

For example, when γ is a square root of 2 (root 2), an initial rise is large in the vicinity of 0 and it moderately changes as getting closer to 1 or, when γ is 2, the initial rise is small in the vicinity of 0 and it precipitously changes as getting closer to 1. The optimum γ is determined by experiments.

According to Expression (6) in FIG. 10, the likelihood L(x) is corrected to become small as the reliability falls (as the sum total of the weight parameters Wi decreases).

Consequently, a group of the observation regions having the extremely low reliability can be excluded from search targets.

In this manner, the image recognition device 2 includes likelihood correcting means for correcting a likelihood to become small as a sum total of the weight parameters Wi in a group of the overall observation region 5 and the partial observation regions 6 decreases.

According to the third embodiment, the following effects can be provided.
(1) The reliability of a likelihood can be reflected in the likelihood calculation by the reliability factor using weights based on a sum total of the weight parameters Wi.
(2) In case of providing a likelihood distribution, groups of observation regions with the low reliability can be weeded out, and groups of observation regions with the high reliability can be saved.
(3) When groups of observation regions in which regions to be observed are extremely biased to one part are selectively ignored and groups in which observation is well-balanced as a whole are preferentially treated, observation results provided by more overall observation regions 5 and partial observation regions 6 can be reflected in the likelihood calculation.
(4) The sensitivity can be adjusted by the γ correction.

Fourth Embodiment

In this embodiment, a load is applied to a likelihood calculation biased to either an HOG feature amount or a color distribution feature mount, and a likelihood using a proper balance of both the feature amounts is increased.

It can be said that a likelihood extremely biased to one of the HOG feature amount and the color distribution feature amount has low reliability, and Expression (6) in FIG. 10 is multiplied by Expression (7) to remedy this problem in this embodiment.

The term (6a) described above is the reliability factor to evaluate a reduction in reliability due to an extreme bias of the weight parameters Wi, and Expression (7) is a reliability factor to evaluate a reduction in reliability due to an extreme bias of αi.

max is a maximum value which can be taken by αi, and it is set to 0.75 here. Raising to the power of u or the power of v corresponds to the gamma correction, and it is a parameter to adjust characteristics of an influence of the bias of αi on the likelihood calculation.

Expression (7) in FIG. 10 has been empirically obtained by the inventor of this application, and it approximates 1 as αi of each observation region becomes close to 0.5 or decreases as the same becomes far from 0.5.

That is, this expression becomes 1 when the HOG feature amount and the color distribution feature amount are equally balanced, or it approximates 0 as they become unbalanced.

Thus, a likelihood is corrected to become lower when the balance of the HOG feature amount and the color distribution feature amount is poor.

Expression (7) in FIG. 10 can be multiplied by Expression (1) or Expression (5).

In this manner, the image recognition device 2 includes bias correcting means for performing a correction in such a manner that a likelihood becomes smaller as a ratio αi set by ratio setting means is biased.

According to the fourth embodiment, the following effects can be provided.
(1) Groups of observation regions which tend to use a proper balance of the HOG feature mount and the color distribution feature amount are likely to remain in trials of combinations.
(2) It is possible to reduce a possibility of erroneous recognition due to an extreme bias to any image feature amount.
(3) Since αi is searched for in the vicinity of αi at a previous moment, when αi is once extremely biased, this affects subsequent αi, but the influence of the inappropriate αi on the subsequent αi can be suppressed.

Fifth Embodiment

In this embodiment, when tracking has failed, a tracking target is found by switching a state change model, and the tracking is restarted.

Figure 6A:
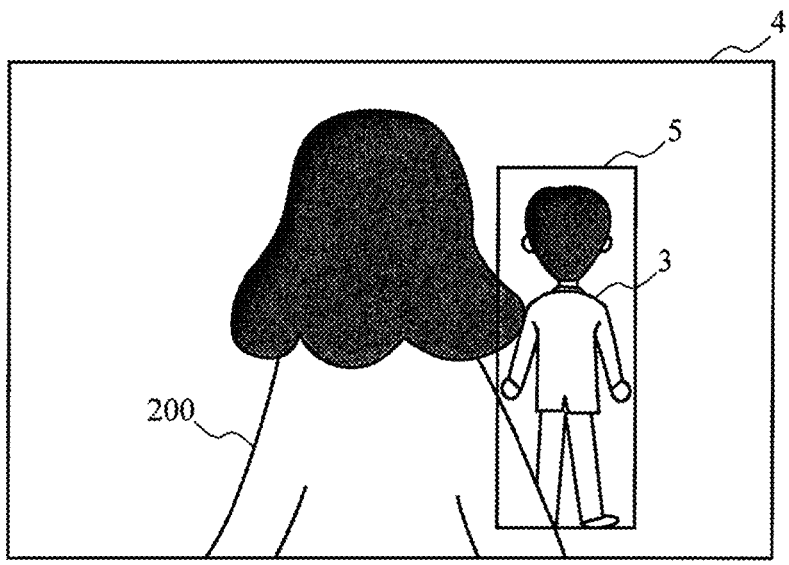
FIG. 6 are drawings for illustrating a failure of tracking and a return to the same.

FIG. 6(a) shows that an image recognition device 2 recognizes an object 3 and tracks the object 3 with the use of an overall observation region 5 and non-illustrated partial observation regions 6.

Figure 6B:
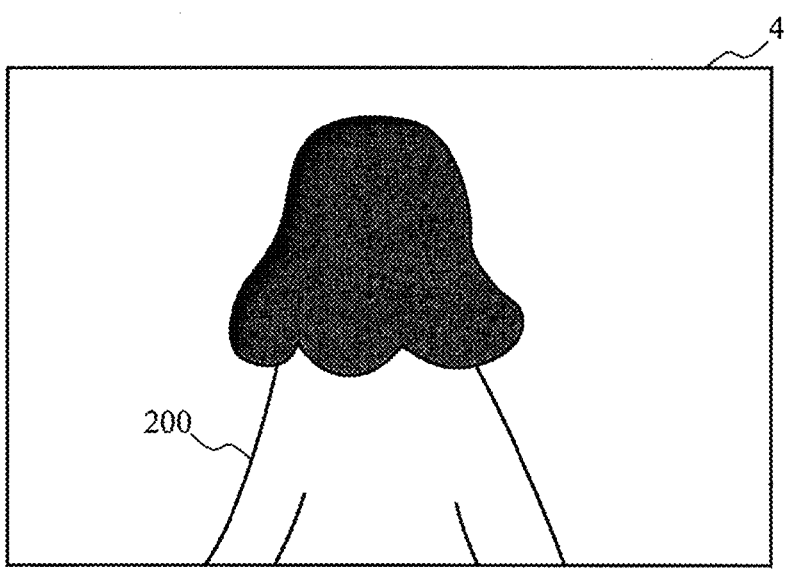

FIG. 6(b) shows that the object 3 has cut in to the front side of a pedestrian 200 during tracking and disappeared from a field of view of a camera 1.

When the object 3 disappears from an image of the camera 1, correlation coefficients of the respective observation regions are sequentially lowered, and the tracking fails.

The image recognition device 2 detects a tracking failure from a change in correlation coefficients R(xi) or weight parameters Wi of the respective observation regions.

For example, the image recognition device 2 determines that the tracking has failed when a likelihood L (x) fell below a predetermined threshold value Th1 or when a total of the weight parameters Wi fell below a predetermined threshold value Th2.

Under the former condition, when an observation region with an extremely high correlation coefficient R(xi) is present, this presence enables the tracking.

Under the latter condition, when most observation regions are hidden, there is much noise, and hence the tracking is cut off.

When the tracking failure has been determined in this manner, the image recognition device 2 switches a state change model as follows to expand a search range, and tries finding the object 3.

First, in relation to a coordinate of each observation region, a size of each observation region, or the like, a variance value of Gaussian white noise is set to be higher than that in tracking. Consequently, the object 3 whose state greatly changes during the tracking failure can be easily observed.

It is to be noted that the variance value may be determined as a function of time, and it may be expanded with time in such a manner that the search range can be expanded as a time during which visual contact with the object 3 is lost becomes longer.

Values of the weight parameters αi and the weight parameters Wi after a change are estimated during the tracking in a Gaussian distribution mainly having values at a previous moment respectively, but how these values turn after the failure is unclear, and hence these values are determined as random numbers and a change is carried out without taking a state at the previous moment into consideration.

When a state where the entire object 3 is hidden is eliminated, a first observation region where the observation is enabled is unknown, and hence any state is considered by an estimate using the random numbers.

Further, a cycle of a state change, observation, and duplication is repeated at the time of the tracking, but a cycle of a state change and observation is repeated at the time of the failure.

Figure 6C:
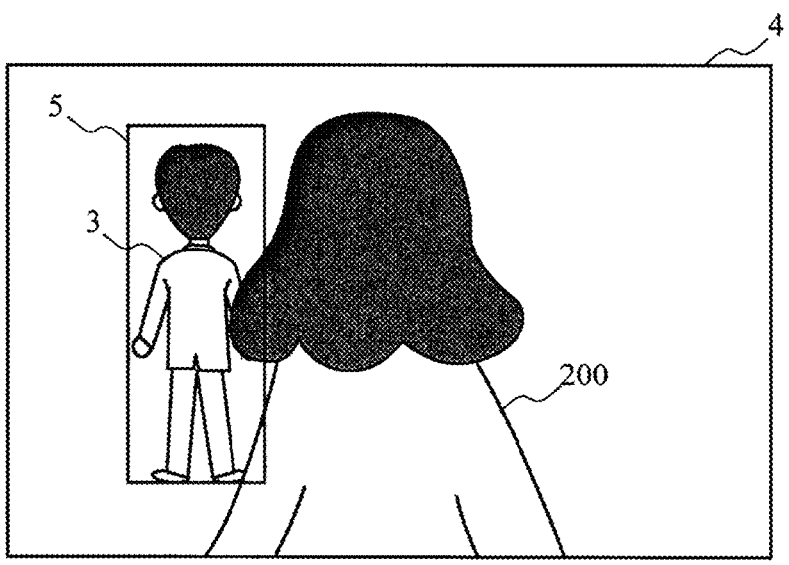

As shown in FIG. 6(c), when the object 3 has been found, the image recognition device 2 again sets the overall observation region 5 and the non-illustrated partial observation regions 6 and restarts the tracking.

In this manner, the ratio setting means and the weight setting means set ratios and weights to arbitrary values which are irrelevant to an image at a previous moment when detection of a tracking target has failed.

According to the fifth embodiment, the following effects can be provided.

(1) Even if a whole body or a large part of the object 3 has been hidden and the tracking has thereby failed, the processing can be rapidly restored when the object 3 begins to reappear.

(2) A state change model for the tracking and a state change model for the tracking failure are prepared, and the state change models to be used can be changed over in correspondence with a tracking situation.

(3) In the state change model for the tracking failure, it is possible to set values suitable for discovery of the object 3, for example, it is possible to expand a search range on the basis of a position at the time of the failure in relation to a position or the like or to randomly change the weight parameters αi and the weight parameters Wi.

(4) Since a mode which enables restoration even if the tracking has failed is prepared, it is possible to withstand a use even at a place where pedestrian and motor vehicle traffic is heavy.

Figure 7:
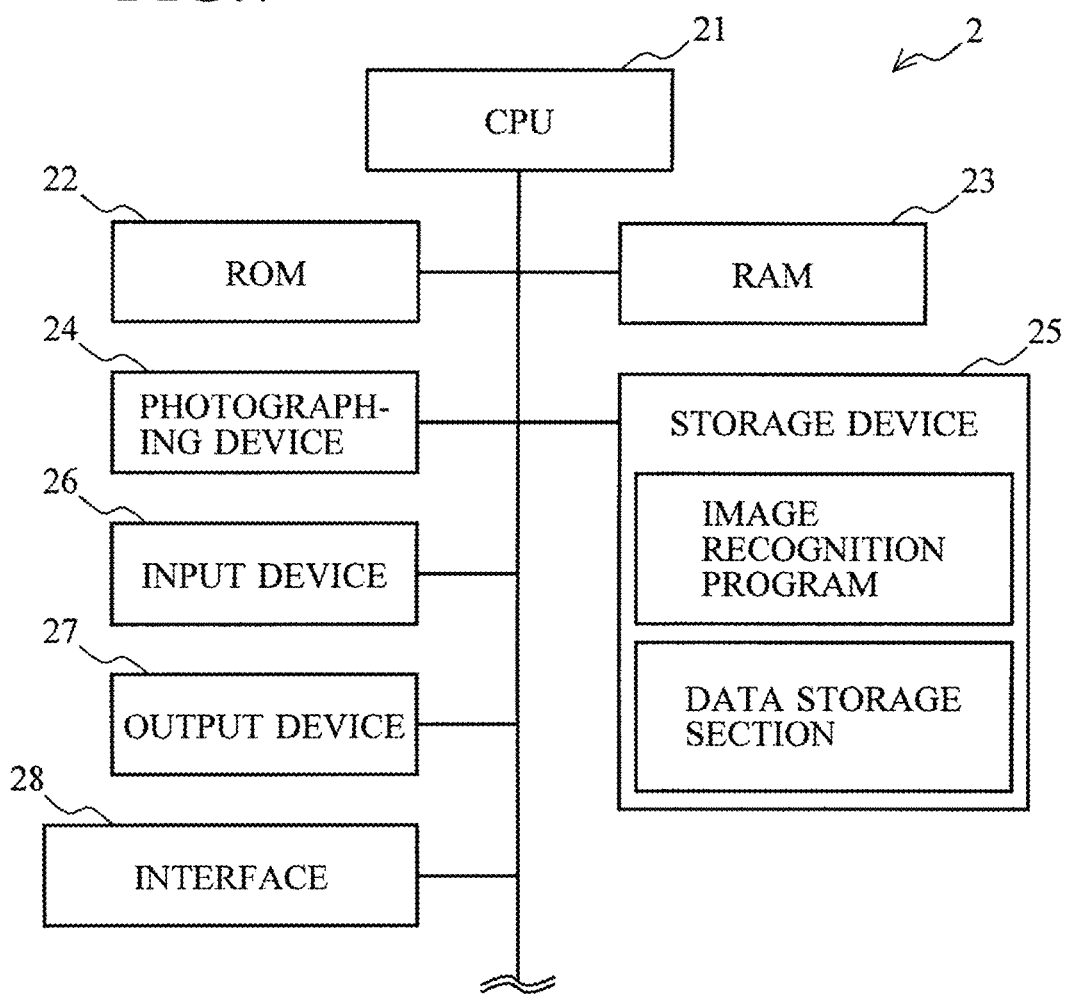
FIG. 7 is a drawing for illustrating a hardware configuration of the image recognition device.

FIG. 7 is a drawing for illustrating a hardware configuration of the image recognition device 2. This configuration is common to the first to fifth embodiments.

The image recognition device 2 is constituted of a CPU (Central Processing Unit) 21, an ROM (Read Only Memory) 22, an RAM (Random Access Memory) 23, a photographing device 24, a storage device 25, an input device 26, an output device 27, an interface 28, and the like connected through a bus line.

The CPU 21 executes image recognition processing in accordance with an image recognition program stored in the storage device 25 as well as control over each section in the image recognition device 2.

More specifically, the CPU 21 sets observation regions to an image 4 input from the photographing device 24, and recognizes and tracks an object 3.

The ROM 22 is a read only memory which stores basic programs, parameters, and the like to operate the image recognition device 2 by the CPU 21.

The RAM 23 is a readable/writable memory which provides a working memory to perform the processing by the CPU 21.

The image 4 input from the photographing device 24 is developed in the RAM 23 and used by the CPU 21.

The photographing device 24 is constituted of an optical system which projects a subject and an imaging surface which converts a projected projection image into an electrical signal, and generates and outputs moving image data which has the image 4 as a frame.

Further, the photographing device 24 also includes a microphone, detects sound by using it, and generates moving image data containing sound.

The storage device 25 is a storage device using, e.g., a storage medium such as a hard disk or a semiconductor memory, and it stores an image recognition program which allows the CPU 21 to execute the image recognition processing.

Furthermore, the storage device 25 also includes a data storage section which stores the captured moving image data.

The input device 26 is a device through which various kinds of information are input to the image recognition device 2, and constituted of input devices such as operation buttons which allow a user to operate the image recognition device 2.

The output device 27 is a device through which the image recognition device 2 outputs various kinds of information, and constituted of output devices such as a liquid crystal display which displays an operation screen or a moving image which is being captured or has been already captured.

The interface 28 is an interface through which the image recognition device 2 is connected to an external device and, for example, the image recognition device 2 is connected to a robot or a vehicle or to a personal computer through the interface 28 to transfer moving image data or tracking data.

Figure 8:
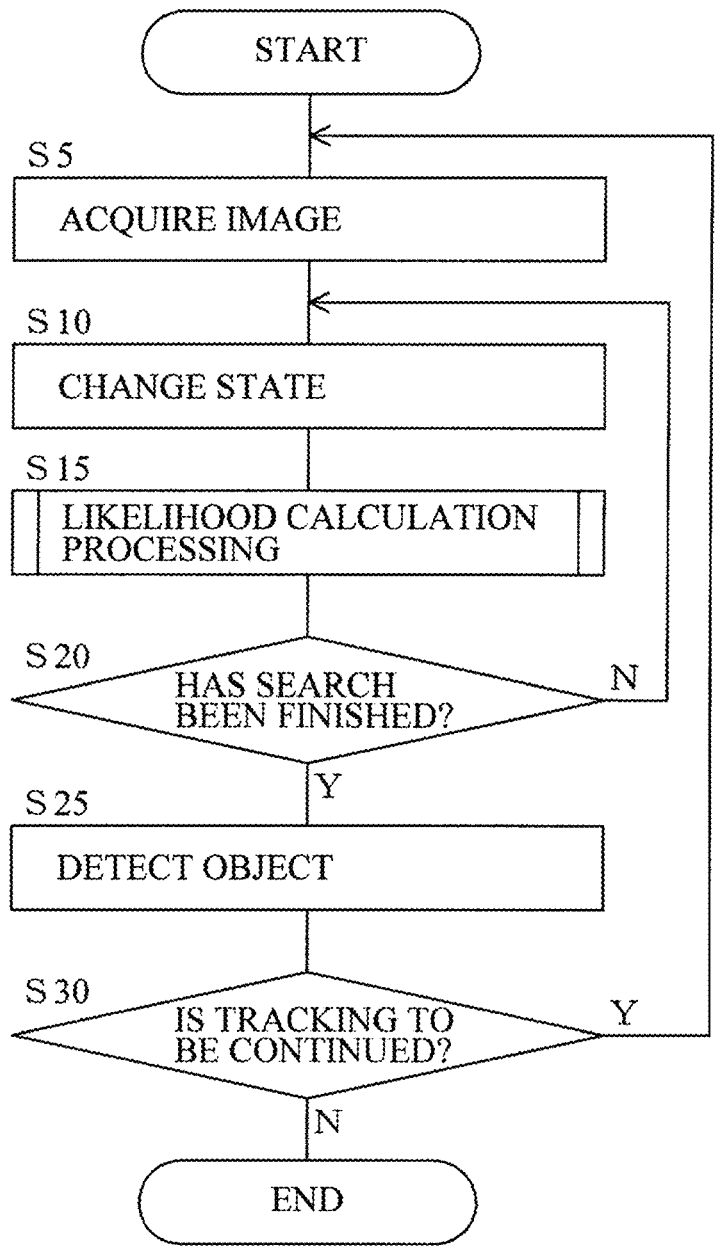
FIG. 8 is a flowchart for illustrating a procedure of image recognition processing.

FIG. 8 is a flowchart for illustrating a procedure to execute the image recognition processing by the image recognition device 2 according to the fifth embodiment.

The following processing is performed by the CPU 21 in accordance with the image recognition program stored in the storage device 25.

First, the image recognition device 2 acquires the image 4 from the photographing device 24, and stores it in the RAM 23 (a step 5).

Then, the image recognition device 2 changes a state by, e.g., superimposing Gaussian white noise on values at a previous moment which are respective state variables (a position of an overall observation region 5, a size of the overall observation region 5, positions of respective partial observation regions 6, respective αi, respective weight parameters Wi, and the like) constituting a state vector (a step 10).

Subsequently, the image recognition device 2 carries out likelihood calculation processing to groups of the observation regions which are determined in a changed state (a step 15).

Then, the image recognition device 2 determines whether the search for the object 3 has been terminated (a step 20).

This determination is made by, e.g., checking whether the search has been completely carried out to reach N which is a particle upper limit.

When the search is yet to be terminated (the step 20; N), the image recognition device 2 returns to the step 10, further changes the state vector, and continues the likelihood calculation.

On the other hand, when the search has been terminated (the step 20; Y), the image recognition device 2 detects the object 3 from a group of the observation regions which provides a maximum likelihood in the searched likelihoods (a step 25).

Then, the image recognition device 2 determines whether tracking is to be continued (a step 30).

This determination is made by checking whether a predetermined tracking terminating operation has been performed, e.g., whether a user has pressed a tracking terminating button.

In case of continuing the tracking (the step 30; Y), the image recognition device 2 returns to the step 5 and executes the same processing to a subsequent image constituting the moving image frame to detect the object 3.

On the other hand, in case of terminating the tracking (the step 30; N), the image recognition device 2 finishes the processing.

As described above, the image recognition device 2 continuously detects the object 3 in frame images of a continuous moving image and thereby tracks the object 3.

Figure 9:
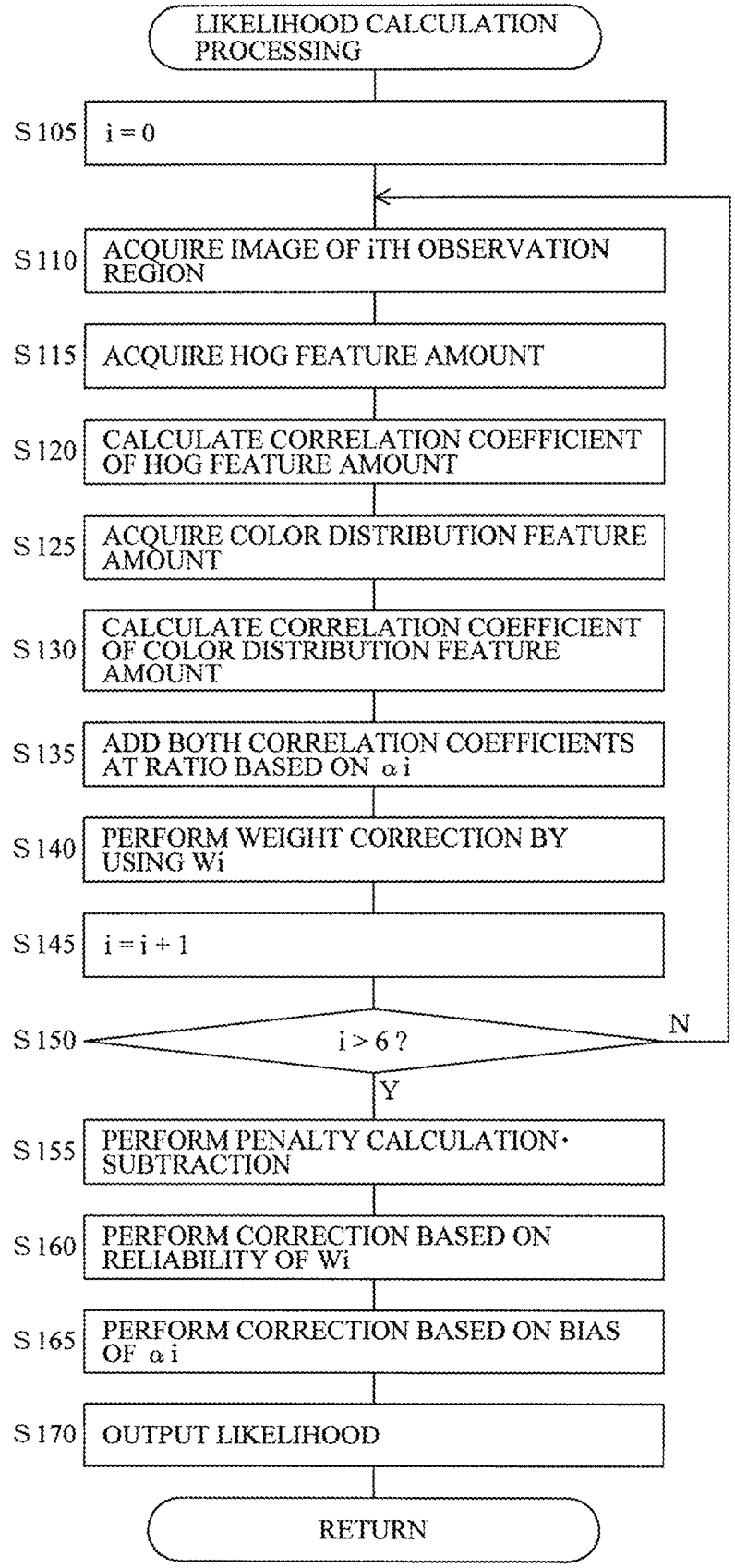
FIG. 9 is a drawing for illustrating likelihood calculation processing.

FIG. 9 is a drawing for illustrating the likelihood calculation processing of the step 15.

The image recognition device 2 initializes a parameter i which identifies the observation regions to 0 (a step 105).

Here, it is assumed that six partial observation regions 6 are present. Thus, i=0 corresponds to the overall observation region 5, and i=1 to 6 corresponds to the partial observation regions 6a to 6f.

Subsequently, the image recognition device 2 acquires an image of an ith observation region (a step 110). For example, in case of i=0, an image of the overall observation region 5 is acquired.

Moreover, the image recognition device 2 acquires an HOG feature amount $\phi$ (xi) from the image of the ith observation region (a step 115), and calculates a correlation coefficient of the HOG feature amount by using the term (2a) of Expression (2) in FIG. 10 (a step 120).

Then, the image recognition device 2 acquires a color distribution feature amount qi from the image of ith observation region (a step 125), and calculates a correlation coefficient of the color distribution feature amount by using the term (2b) of Expression (2) (a step 130).

Subsequently, the image recognition device 2 adds both the correlation coefficients at a ratio based on the weight parameter αi, and calculates R(xi) in Expression (2) (a step 135).

Then, the image recognition device 2 multiplies R(xi) by the weight parameter Wi to correct a weight of R(xi) (a step 140).

Subsequently, the image recognition device 2 increments i by 1 (a step 145), and determines whether i is larger than 6 (a step 150).

When i is 6 or less (the step 150; N), since there are unprocessed partial observation regions 6, the processing returns to the step 110, and the next partial observation region 6 is processed.

On the other hand, when i is larger than 6 (the step 150; Y), since the correlation coefficients of the overall observation region 5 and all the partial observation regions 6 have been calculated, penalties of the respective partial observation regions 6 are calculated by using the term (1b) of Expression (1) in FIG. 10, and a total of the penalties is subtracted from R(x) (a step 155).

Then, the image recognition device 2 corrects the likelihood L (x) by using the term (6a) of Expression (6) in FIG. 10 on the basis of the reliability of the weight parameter Wi (a step 160).

Additionally, the image recognition device 2 calculates a correction term provided due to a bias of αi by using Expression (7) in FIG. 10, and multiplies this term by a value of Expression (6) calculated at the step 160 to correct the likelihood L(x) (a step 165).

Then, the image recognition device 2 outputs the likelihood L(x) subjected to various kinds of corrections (a step 170).

Sixth Embodiment

In this embodiment, a camera 1 including an image recognition device 2 is mounted in a mobile body.

Since the camera 1 can track a target with robustness against a change in environment, it can be mounted in a mobile body and track the target while moving in various environments.

For example, when the mobile body is a vehicle, the camera 1 is installed in a front part of the vehicle to photograph the foreground.

Consequently, when the vehicle tracks another vehicle traveling ahead with the use of videos of the camera 1, it can follow this vehicle to perform so-called convoy traveling, or it can put on a brake or change a traveling direction to perform an avoidance operation if a collision danger is determined from a tracking trajectory of a vehicle or a pedestrian traveling ahead. In this manner, the image recognition device 2 can be applied to an automatic driving technology or any other technology.

Further, when the mobile body is a robot, the device can be used as an eye of the robot to, for example, provide services at home (e.g., following a master while holding baggage), hold a moving target with a robot arm while tracking it, or guide livestock while tracking it, and it can be used in respective fields such as a consumer field, an industrial field, an agricultural field, or an industrial field.

As described above, in this embodiment, it is possible to provide a mobile device including detecting means which detects a target with the use of the image recognition device 2 and moving means which moves to a predetermined position with respect to the detected target.

The above-described embodiments are just examples and can be modified in many ways.

(2) The image recognition device 2 recognizes each image by using a combination of, e.g., two image feature elements (the HOG feature amount and the color distribution feature amount), but it is not restricted thereto, and any other image feature element can be used, and three or more image feature elements may be combined.

For example, in case of combining three or more image feature elements, a first feature amount, a second feature amount, and a third feature amount are added at a ratio of αi, βi, and 1−αi−βi. However, 0<αi, βi<1, and αi+βi<1 are achieved. To necessarily include all feature elements at a ratio which is the minimum, values of αi and βi may be restricted.

Other image feature elements than the HOG feature element and the color distribution feature element can be used.

(2) In the image recognition device 2, for example, the correlation coefficient R(xi) is calculated by using a linear sum which is based on the ratio αi of the correlation coefficient of the HOG feature amount and the color distribution feature amount, but this does not restrict the method for calculating R(xi), and R(xi) may be calculated by an arbitrary calculation method on the basis of a combination of the HOG feature amount, the color distribution feature amount, and αi.

(3) The image recognition device 2 detects the object 3 by using a combination of the overall observation region 5 and the plurality of partial observation regions 6, but the technology to recognize a target by combining a plurality of types of image feature data which is a characteristic of this embodiment can be applied to a system which recognizes a target with the use of a single detection window.

EXPLANATION OF LETTERS OR NUMERALS 1 camera
2 image recognition device
3 object
4 image
5 overall observation region
6 partial observation region
21 CPU
22 ROM
23 RAM
24 photographing device
25 storage device
26 input device
27 output device
28 interface
31, 32 spot
101 image
102 cell
106, 107 histogram
109, 110, 111, 123, 124, 125 vector
121, 122 histogram
200 pedestrian

The invention claimed is:

1. An image recognition device comprising:
a camera configured to acquire an image; and
a processor programmed to:
set an observation region where a tracking target is observed in the acquired image based on a prior observation region used for detecting the tracking target in a previous image at a previous moment;
acquire a plurality of types of image feature amounts from the set observation region;
acquire a feature correlation coefficient relative to a reference feature amount in accordance with each of the acquired image feature amounts;
set a ratio of combining the feature correlation coefficients for the respective acquired image feature amounts based on a ratio used for detection of the tracking target in the previous image at the previous moment;
acquire a region correlation coefficient for the observation region by combining the feature correlation coefficients at the set ratio;
repeatedly acquire a likelihood of a target observed in the observation region based on the acquired region correlation coefficient while changing the set observation region and the set ratio; and
detect the tracking target in the observation region in which a likelihood meeting a predetermined condition in the plurality of acquired likelihoods is acquired.

2. The image recognition device according to claim 1, wherein the processor sets a group of an overall observation region where the whole tracking target is observed and a plurality of partial observation regions where parts of the tracking target are observed as the observation region,
the processor acquires the plurality of types of image feature amounts in accordance with each of the overall observation region and the partial observation regions,
the processor acquires a feature correlation coefficient for each of the image feature amounts in accordance with each of the overall observation region and the partial observation regions,
the processor sets the ratio in accordance with each of the overall observation region and the partial observation regions,
the processor acquires the region correlation coefficient in accordance with each of the overall observation region and the partial observation regions, and
the processor acquires the likelihood based on the region correlation coefficient for each of the overall observation region and the partial observation regions.

3. The image recognition device according to claim 2, wherein
the processor is further programmed to:
set a weight to the region correlation coefficient for each of the overall observation region and the partial observation regions on the basis of a previous weight used for detection of the tracking target in the previous image at the previous moment, and
the processor repeatedly acquires the likelihood while changing the weight as well.

4. The image recognition device according to claim 3, wherein the processor excludes the region correlation coefficient and acquires the likelihood when the region correlation coefficient falls below a predetermined threshold value.

5. The image recognition device according to claim 3, wherein the processor is further programmed to:
perform a correction to decrease the likelihood particularly of a group of the overall observation region and the partial observation regions having a small sum total of the weights.

6. The image recognition device according to claim 4, wherein the processor is further programmed to:
perform a correction to decrease the likelihood particularly of a group of the overall observation region and the partial observation regions having a small sum total of the weights.

7. The image recognition device according to claim 3, wherein the processor is further programmed to:
perform correction to decrease the likelihood as the is biased.

8. The image recognition device according to claim 4, wherein the processor is further programmed to:
perform correction to decrease the likelihood as the ratio set is biased.

9. The image recognition device according to claim 5, wherein the processor is further programmed to:
perform correction to decrease the likelihood as the set ratio is biased.

10. The image recognition device according to claim 6, wherein the processor is further programmed to:
perform correction to decrease the likelihood as the set ratio is biased.

11. The image recognition device according to claim 3, wherein the processor sets the ratio and the weight to arbitrary values irrelevant to the previous image at the previous moment respectively when detection of the tracking target has failed.

12. The image recognition device according to claim 4, wherein the processor sets the ratio and the weight to arbitrary values irrelevant to the previous image at the previous moment respectively when detection of the tracking target has failed.

13. The image recognition device according to claim 5, wherein the processor sets the ratio and the weight to arbitrary values irrelevant to the previous image at the previous moment respectively when detection of the tracking target has failed.

14. The image recognition device according to claim 6, wherein the processor sets the ratio and the weight to arbitrary values irrelevant to the previous image at the previous moment respectively when detection of the tracking target has failed.

15. The image recognition device according to claim 7, wherein the processor sets the ratio and the weight to arbitrary values irrelevant to the previous image at the previous moment respectively when detection of the tracking target has failed.

16. The image recognition device according to claim 1, wherein the plurality of types of image feature amounts are a luminance gradient distribution feature amount and a color distribution feature amount of the acquired image.

17. The image recognition device according to claim 1, wherein the predetermined condition met by the likelihood is a maximum value of the likelihood.

18. The image recognition device according to claim 1, wherein the processor combines the acquired feature correlation coefficients based on a linear sum of the set ratios.

19. A mobile device comprising:
the image recognition device according to claim 1 for detecting a target; and
a robot or a vehicle configured to move to a predetermined position with respect to the detected target.

20. A non-transitory compute readable medium storing an image recognition program that causes a computer to perform steps comprising:
acquiring an image;
setting an observation region where a tracking target is observed in the acquired image based on prior observation region used for detecting the tracking target in a previous image at a previous moment;
acquiring a plurality of types of image feature amounts from the set observation region;
acquiring a feature correlation coefficient relative to a reference feature amount in accordance with each of the acquired image feature amounts;
setting a ratio of combining the feature correlation coefficients for the respective acquired image feature amounts based on a prior ratio used for detection of the tracking target in the previous image at the previous moment;
acquiring a region correlation coefficient for the observation region by combining the feature correlation coefficients at the set ratio;
repeatedly acquiring a likelihood of a target observed in the observation region based on the acquired region correlation coefficient while changing the set observation region and the set ratio; and
detecting the tracking target in the observation region in which a likelihood meeting a predetermined condition in the plurality of acquired likelihoods is acquired.

21. An image recognition method comprising:
acquiring an image;
setting an observation region where a tracking target is observed in the acquired image based on a prior observation region used for detecting the tracking target in a previous image at a previous moment;
acquiring a plurality of types of image feature amounts from the set observation region;
acquiring a feature correlation coefficient relative to a reference feature amount in accordance with each of the acquired image feature amounts;
setting a ratio of combining the feature correlation coefficients for the respective acquired image feature amounts based on a prior ratio used for detection of the tracking target in the previous image at the previous moment;
acquiring a region correlation coefficient for the observation region by combining the feature correlation coefficients at the set ratio;
repeatedly acquiring a likelihood of a target observed in the observation region based on the acquired region correlation coefficient while changing the set observation region and the set ratio; and
detecting the tracking target in the observation region in which a likelihood meeting a predetermined condition in the plurality of acquired likelihoods is acquired.

* * * * *